Feb. 22, 1944.　　　　F. V. ELBERTZ　　　　2,342,129
PRODUCTION OF BEVEL GEARS
Filed Nov. 2, 1940　　　　6 Sheets-Sheet 3

Inventor.
Frank V. Elbertz.
By Horace G. Seitz
Attorney

Patented Feb. 22, 1944

2,342,129

UNITED STATES PATENT OFFICE 2,342,129

PRODUCTION OF BEVEL GEARS

Frank V. Elbertz, Lake Orion, Mich.

Application November 2, 1940, Serial No. 364,076

22 Claims. (Cl. 90—2)

This invention relates to the production of bevel gears, and pertains more particularly to mechanism for producing such gears with precision and under rapid production conditions.

A number of types of gearing have been in use, these including the spur gear and the bevel gear—the latter (in its straight tooth form) being the basis of the present invention.

Because of the necessity for machine production to obtain the volume of gears needed, the advance in the direction of perfection has always found the bevel gear type as lagging behind the spur gear type. There are several reasons for this condition, the principal one being brought about by the differences in the types. For instance, in a spur gear, the radius of any point on a tooth is of similar length at both ends of the tooth, while in straight-tooth bevel gearing similar points at opposite ends of the tooth have different radii, with this variation in length of radii present throughout the length of the tooth; in other words, in contrast with the spur gear, the teeth of the bevel gear must conform to the conditions set up by the geometric conical formation of the bevel gear, with the result that all parts of the tooth as well as the space between adjacent teeth must all be based on lines converging to the apex of the cone, while the lines of the spur gear are in complete parallelism.

The lag in the development of perfection of the bevel gear has been due, in the main, to the fact that, unlike the spur gear, the translation of the engineer's conception as to profile into the physical tooth is the primary and major problem, due to the geometric conical formation of the bevel-gear referred to above. For instance, the perfected spur gear tooth profile could serve as the engineer's conception for translation into the tooth form of the bevel gear. But any attempt to make such translation is met by the condition that the physical tooth must produce this profile under the conical conditions referred to, a fact that so increases the difficulties as to set up a controlling factor as to the possibilities of a true translation; the difficulties have been such that the prior developments have been unable to completely utilize all of the developments which have been made in the spur gear profiles. Attempts have been made to utilize all of the spur gear developments, but it has been found that while some success was had in one direction, the change set up other conditions which provided disadvantages in other directions.

Another factor that has been present in this lag as between the two types, pertains to the matter of the engineering conception as to the form of the teeth, but since that does not reach to the matter of the translation into the physical tooth formation, it is not discussed herein, since the translation into the physical form begins with the completed engineer's conception.

The present invention has been designed with a view to the development of a machine through which it would be possible to produce the straight-tooth bevel gear profile in such form as to present exactly the same service characteristics as are found in the profile of the spur gear tooth, thus making possible the translation into the bevel gear type all of the developments which have brought the spur gear type to its perfect service condition, the machine thus taking its place in the art of gear production as the one to close the gap of service condition possibilities between the spur and bevel gear types and to place the two types with identical service and functional characteristics.

The general object of the invention is, therefore, to provide a machine structure which, in service, will produce the above results, and thereby produce gear structures in which the gear teeth are fashioned with extreme accuracy as based on the engineer's conception of tooth form, with the cutting of the teeth produced with rapidity and thus largely increasing the productive capacity, per machine, in this particular field, and with the machine operation of simple type so that accuracy is not made dependent upon the skill of the workman operating the machine, although the machine of the present disclosure is itself of the manually manipulated type.

To these and other ends, therefore, the nature of which will be better understood as the invention is hereinafter disclosed in detail, said invention consists in the improved combinations and constructions of parts, hereinafter more fully described, hereinafter illustrated in the accompanying drawings, and more particularly pointed out in the appended claims.

In the drawings, in which similar reference characters indicate similar parts in each of the views, Figure 1 is a general plan view of the machine when based upon the characteristic condition that the work-head is the movable unit of the machine, the machine being illustrated as located in two positions, one of these being shown in full lines, the other in dotted lines.

Fig. 8 indicates the position when the tooth face profile has been completed, and Fig. 7 illustrating a position intermediate those of Figs. 6 and 8.

Figure 1:
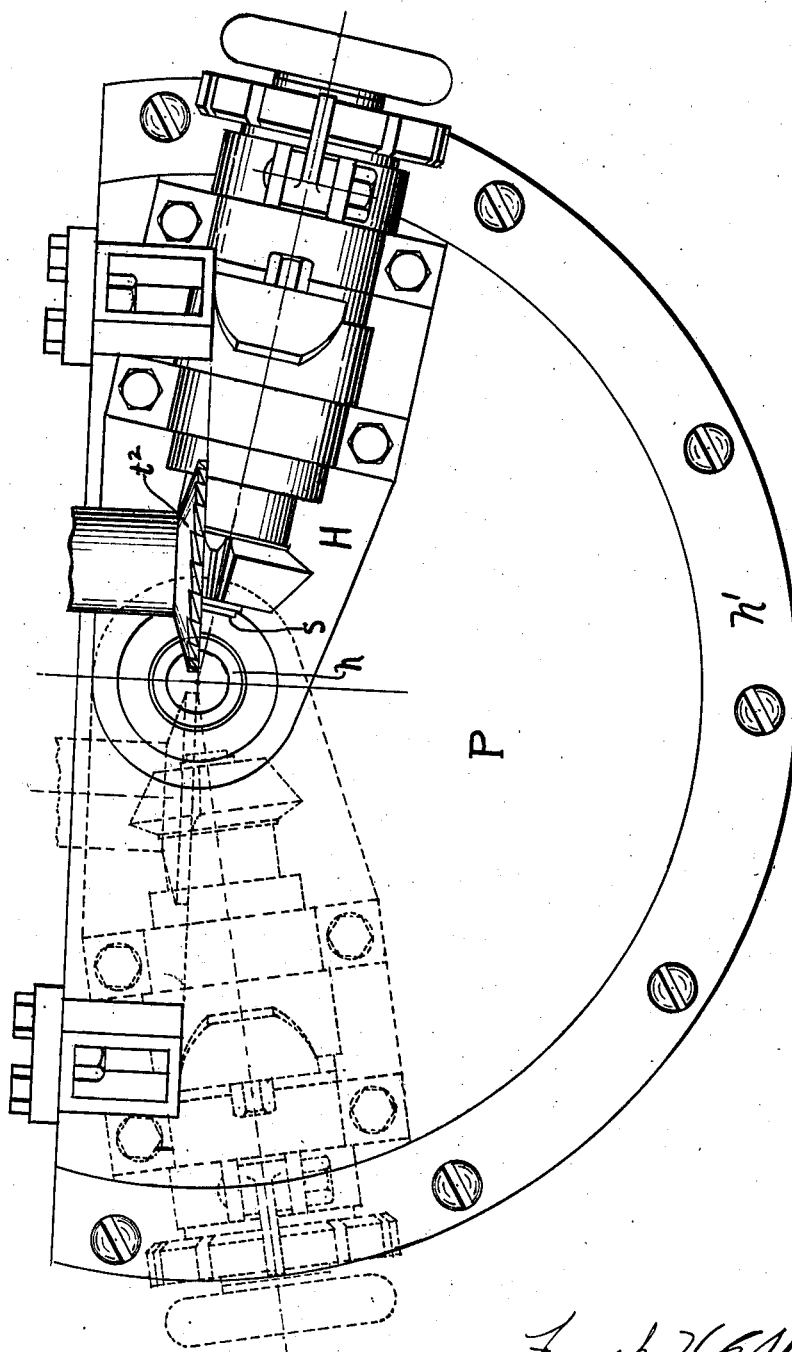

The theoretical basis on which the present invention has been developed rests upon a few basic facts, amongst which is the following: If the work—the gear on which the tooth profile is to be produced—is fed progressively relative to a fixed cutting plane, with such plane extending through the apex of the geometric conical formation which includes the tooth zone of the gear, with the feeding action both rotative on the gear axis and bodily about such apex, it will be possible to utilize a rotating cutter, the periphery and a side of which are provided with flutes and/or teeth which are active on such cutting plane, provided, the work be presented to the cutter by a bodily advancing movement about such apex, and the work be concurrently rotated on its own axis by a master carrying a profile contour which corresponds accurately with the proposed tooth face contour, and with such master profile contour made active with a guide face (also located on the cutting plane) and by the bodily advance of the work; obviously, the cutter, guide face, and the cutting plane, could be swung bodily about such apex, and the work retain a stationary location but be rotatable on its axis by the co-action of master and guide face—a change which would simply shift the bodily advance movement from the work to the cutter without change in result (the work would be presented to the cutter in either case).

In either case, the cutter would remove metal of the tooth space with the profile wall of the space under production controlled by the master profile contour then active with the guide face, with the succession of flutes and/or teeth active to remove small increments of metal from the tooth space in rapid succession. With a machine based on these fundamentals, it would be possible to provide for a rapid production of the tooth profile, and the profile of the master could be given the exact shape to translate the exact equivalent of the spur gear perfected tooth profile on to the bevel gear.

The present disclosure presents the development of this theory into practice. For the purpose of the development the machine was based on manual manipulation to simplify the construction, and, for such simplification the machine was designed in such manner that the cutting of the complete profile of a tooth and space was provided in two operations instead of a single one—the machine cutting one side of each of the teeth and space of the gear by successive operations, after which the head was shifted and the opposite side of each tooth and space produced successively with the machine in the new position.

The specific structure and arrangement of the machine is disclosed in the drawings, in which the line representing the "center of the machine" is indicated at C, this line also representing the apex of the geometrical conical formation on the lines of which various features of the structure are to be found. For instance, the pivotal axis of the work head H is located on line C; the axis of the work spindle S, when extended, intersects this line C; the line representing the cutting and/or guide plane, passes through line C, the latter plane being a vertical plane, thus including line C which also extends vertically. In this form the head is carried by a supporting plate P, which carries the pivot $h$ for the head H, and preferably carries an arcuate guide flange $h'$ which aids steadying of the head and in providing accuracy in the swinging movements of the head H about its pivot $h$. The support P has dimensions such as will permit the head H to swing through approximately 180°, to enable the head to swing between its two base positions, the guide flange $h'$ having its arcurate length sufficient to preserve the conditions pointed out when the head is in either position.

The support of base P is also adapted to carry the guides which co-operate with the master in the control of the work, the specific form of support being as preferred, the drawings disclosing a vertical plate 10 which, in turn, carries the guide formation F of suitable type but which carries a vertical face $f$ located on the cutting and/or guide plane G. To meet the conditions of the swing of the head H to its second position, the plate 10, guide F and face $f$, are duplicated and located on the same face of the support or base, but beyond the center line of the machine a distance equal to that of the first guide from such center line, and therefore in position to be contacted by the master, as presently described. Only one of the guide formations F are active at any time. Obviously, the guide formations may be of any desired type, and while they are referred to as in duplicate, it is apparent that they may differ from each other, if desired, as long as the face $f$ of the guide is located on the plane G and is located accessible to the master during swinging movements of the head H.

The cutter T is designed to be carried by a separate head, not shown in detail, with the head of a type which will locate the axis of the cutter as extending horizontally and normal to the cutting plane G. To permit adjustment of the cutter its head will be capable of locating the cutter axis at any desired point, heads of this type being well-known in the art. The cutter T may be any one of a number of different structures, each of which, however, carries on a side face, an annular fluted zone, the flutes $t$ of which have the characteristics of teeth of any desired formation, these teeth $t$ extending in a generally radial direction, but preferably carrying a variation from the true radius known as a "hook" and "rake" which may be of desired value and form. The cutter is positioned to locate the outer or working faces of the teeth on the cutting and/or guide plane G, thus placing the main profile cutting zone of the cutter on a side face of the cutter. The periphery of the cutter has a face preferably of a width sufficient to permit it to extend over at least half the width of the root zone of the tooth space, although such width may be varied from such dimensions, it being designed generally, that the root zone of the tooth space will be completed when the head operations in the two positions are completed; but in no case would the width of such peripheral face be greater than the width of such root zone of the tooth space. The peripheral face is preferably formed with cutting teeth $t'$ of a desired form.

If the blank be preliminarily gashed, the cutter requires only the presence of these two zones, the rotation of the cutter on its axis providing the removal of the remaining metal of the tooth space. Where the blank is not gashed, and especially where the root depth is of larger values, I prefer to utilize the cutter operations in cutting the first series of profiles to concurrently "rough out" metal of the tooth space in the direction of the opposite profile of the tooth space, thus tending to set up a semi-gashing effect when forming the first profiles. To accomplish this, the cutters for this service would be located on the opposite side face $t^2$ of the cutter, with the tooth faces of such face inclined to increase the thickness of the cutter toward the central zone of the cutter, thus setting up somewhat of the characteristics of a wedge cutter, to thereby meet the conditions of diverging wall profiles of a tooth space; however, in such form of cutter the thickness of the combined cutting faces of the cutter within that portion of a radius of the cutter which would be active in cutting the tooth space of a gear is always less than the width of the finished space.

While the specific head for the cutter is not disclosed in detail herein—it may be any one of a number of well-known structures capable of providing the necessary adjustments—such head has a definite and fixed relation to the support P as indicated in the drawings, the support in this form, carrying a stanchion $p$ which supports a standard $p'$ to which the head is secured, this forming a simple structural formation suitable for the particular form of machine disclosed herein. The purpose of this mounting is to definitely secure the presence of one of the important essentials in the present invention, viz.: that the guide plane and the cutting plane become the same plane and remain in this relation. With the guide formations F carried by support P, and the support for the cutter carried by the same element, it will be possible to secure this result, since any adjustments made will be based on the fact that both are carried by the same element.

In other words, the support P, the guide formations F, and the cutter head and cutter produce what may be termed a "cutting unit," the parts of which have generally a constant definite relationship to one another and to the center line of the machine, thus assuring that not only can a positive cutting and/or guide plane be secured, but that such plane will include the center line of the machine, thus making possible the fulfilment of the conditions which provide the fundamental basis of the machine activities. It would be possible, of course, that the cutter head and/or the guide formations could be carried independent of the support P; in such case, however, it would be necessary that the locations be such as to not only set up such vertical cutting and/or guide plane, but that such plane include the center line of the machine, and that this relationship be continuous during the active cutting of the teeth; the separation of the cutter and guide formations from support P could be provided, but it opens up the possibility that variations in such plane as well as the relationship of the plane could be disturbed through machine operation, and for this reason it is preferred to locate these structures in direct connection with the support P, as indicated, since the support itself has the definite relationship with the center line of the machine. Regardless of which of these types may be employed, the essential feature as to the presence of the cutting and/or guide plane must be present and include the center line of the machine, so that the latter condition is actually the controlling factor, and whether or not there be a physical connection or separation between the support P and the cutting and/or guiding structures, the controlling characteristics of the "cutting unit" are and must be present, so that the connected form or the separated form are considered as falling within the invention, since the difference is simply one of choice or preference or of machine designing and with the purpose of securing the same particular result.

While support P, in this form, also forms a support for the work head, the above condition is not changed thereby. This can be understood from the fact that the work head, in service, must inevitably move relative to the support with the movement in a plane normal to the centerline of the machine, and with the movements about such center line of the machine, thus making the work-head movements swinging or arcuate. To provide assurance of these conditions, the support P carries the pivot $h$ about which the swinging movements take place, and the arcuate retaining member $h'$ to prevent raising of the head and to relieve stresses during service, these simply locating the work head and defining its bodily movements. Under these conditions, the support P is considered as a part of the cutting unit—with which it remains unchanged in service, rather than as a part of the work-head unit since the activity of the latter can be had only by movement relative to the support.

The work head H of this form is made up of an assemblage of elements as follows:

The base 15 of the head has a suitable configuration in plan view, and has an opening 16 through which pivot $h$ extends, a suitable locknut 17 serving to prevent raising of this portion of the head during service, the outer peripheral zone is shaped to co-operate with retaining member $h'$ in producing a similar effect in this zone. In other words, the base 15 is so supported as to ensure a minimum possibility of looseness or lost motion, since it is essential that if accuracy in tooth production or maximum speed conditions is to be obtained, looseness or lost motion must be absent.

The base carries a pair of vertical stanchions 18, these being designed to support the assemblage which forms the working portion of the head, these being in the form of spindle S, and sleeves, etc., mounted thereon to form an assemblage for providing the activities of the head; as the spindle forms the inner member of the assembly, the other elements will be described relative thereto.

The spindle S, as previously explained, has its line of axis extending through the center line of the machine in all positions of the head. The spindle does not extend to such center line, but may have the distance between its forward end and the center line varied within certain limits, depending upon the dimensions of the gear to be cut, the gear being mounted on the spindle adjacent the forward end of the latter, the spindle preferably having a headed portion s to form an abutment, a spacing washer 19 being interposed between such headed portion and the gear. Mounted on the spindle, in rear of the positioned gear, is an adapter 20, bored to closely fit the spindle, and having its advance end shaped to fit the rear of the central zone of the gear, and being shouldered, as at 20a, to form a reduced portion which lies within a sleeve 21. The rear end zone of the adapter is also recessed and provided with internal threads, to receive the advance end of a sleeve 22, carried by the spindle and which is threaded to the adapter, the sleeve 22 having its rear end flanged, as at 22a to form a shoulder against which the rear end of sleeve 21 abuts. The rear end of the spindle is threaded, as at s2, to receive a locking element 23— which may be in the form of a threaded wheel.

As will be understood, the spindle—which is bodily removable from the assembly by endwise movement—is locked to the surrounding elements by the parts just described, by threading the locking member 23, such threading tending to draw the spindle rearward against the tension of a washer 19, thus properly positioning the gear and locking it to the spindle and the assembly. Sleeve 22 and the adapter are adjustably secured together through the threaded connection, and with sleeve 21 adapted to prevent the inward movement of the adapter and sleeve 22, it can be understood that when the locking element 23 is threaded into clamping position, the spindle, gear, adapter, and sleeve 21 become the equivalent of a temporary unit capable of a rotating movement within the head, although release of the locking element will enable the temporary unit condition to be broken and permit positioning or removal of gears.

Sleeve 21 supports a sleevelike member 24 which, functionally, is designed to form the hub of the master M, member 24 itself being rotatable on but connected with sleeve 21, these two parts being designed to be connected and disconnected through the indexing mechanism. Member 24 has reduced portions which fit within the stanchions 18, being held to position relative to the stanchions by a lock-nut 24a, a lock-nut 21a, on sleeve 21, co-operating in this result. The opposite end of member 24 is keyed to a sleeve 25 of short length and which surrounds member 24; this sleeve 25 carries a pivoted locking element 26, swingable about its pivot into and out of engagement with either of a series of radial slots 27a carried by a ring-like member 27, with the slots extending inwardly from the periphery of the member a distance sufficient to ensure proper action. Member 27 and element 26 constitute the indexing mechanism, slots 27a being accurately positioned to provide the desired number of teeth in the gear, and element 26, engaging a slot, locking member 27 to member 24, through the keyed connection of member 24 and sleeve 25. Member 27 has a dowel connection with a ring 28 which, in turn, is keyed to sleeve 21.

Hence, when element 26 is in engagement with a slot 27a, it is obvious that if any movement in a rotary direction is given to member 24, such motion will be communicated to the spindle S through sleeve 25, element 26, member 27, ring 28, sleeve 21, adapter 20 and sleeve 22, the adapter, through its engagement with the positioned gear, moving the gear in the same direction as member 24 is moving. The master M is carried by member 24, the master and member flange carrying a plurality of bolt connections 29 positioned to ensure against any possibility of relative movement between them, while permitting substitution of one master for another at will.

The master M is necessarily individual to the gear to be cut, since it carries the two profiles which control in the development of the opposite side walls of the tooth space, and in doing this service produce the opposite side walls of a tooth of the gear being cut. Bevel gears may differ one from another in many respects, including dimensions, profile contours, depth of tooth, width of the root of the tooth space, etc., and it is apparent that these distinctions would require that an individual master be fashioned for each, excepting possibly the width of the root of the space and the depth of the space; otherwise, the differences are generally such that a master individual to the "job" should be used. Hence, the master per se is preferably provided independent of member 24 and detachably secured thereto, thus permitting the hub zone of the master assembly to be a permanent part of the head assembly. Because of this condition it is apparent that since the machine will accurately produce the characteristics of the master profile surfaces, the ability to fashion individual master structures to meet any of the problems to be met in straight-tooth bevel gear structures, presents the main problem in the production of the gear, the machine itself being practically of limitless range in this particular field.

The master M projects outwardly from member 24 and may be of a desired shape in the direction of projection—it may extend in a single plane or in a plurality of planes, straight or curved, etc. In the drawings, it is illustrated as projecting at an angle—thus in two planes, and curved laterally; the machine is not, of course, limited to use with this specific form of master, since the master control is provided through contact with the guide face f, and such contact will be provided with any desired form of master; the angular form shown illustrates the varied possibilities in this respect.

The specific mechanism for operatively connecting the master with the gear to be cut, thus described, is preferred, although it is obvious that the form of the mechanism elements can be varied as can be the particular train development. It is simple and yet sturdy; can be assembled and maintained with a minimum amount of looseness or lost motion; permits ready assembly and ensures that any movement of the master will be instantly transmitted to the positioned gear and to the full extent determined by the active master profile; substitution of gears or of master can be readily had without requiring disassembling of parts other than the removal of the master or the loosening up of the spindle, the remaining structure remaining intact; and the indexing mechanism is simple and efficient, and permits of accuracy in indexing.

As pointed out, the mechanism is such that the direction of motion is the same in both the master and the positioned gear blank or work. This condition is desirable, due to the fact that the master profile is to be applied to the gear by the use of the rotating cutter, and the translation is provided by combining two types of movement of the gear relative to the cutting plane, viz., the bodily advancement of the gear along a plane normal to the cutting plane, and a second motion of the gear rotatively on its axis concurrently with the bodily advancing movement and provided by the unit which is itself carrying the blank in such bodily-advancing movement. The motion of the gear on its own axis is a controlled motion synchronized completely with the bodily-advance movement of the work through the co-action between the active master profile and the particular guide face with which it is co-acting; regardless of the rate of bodily advance of the work, the result will be the same, due to the fact that the guide face serves as an abutment to prevent bodily advance of the master profile while the work-spindle—operatively connected with the master, continues the bodily advance as a part of the work unit. Hence, a movement of the master axis relative to the master profile, in effect, is set up, and which serves to control the cutting activity during the bodily advance of the blank, the effect being such that the profile developed on the work by the cutting action will be an exact replica of the master active profile, due to the fact that the cutting plane and the guide face plane are the same plane.

This latter can be readily understood from the fact that in the form of the mechanism disclosed herein, the body portion of the master between the opposing profiles simulates a tooth of the work, so that when the active profile is co-operating with its guide face—with the plane of the guide face the same plane as the cutting plane—the cutting activity will conform completely to that of the active master profile. And since the bodily advance of the work is about the apex of the geometric conical formation, it will be apparent that not only will the physical tooth profile present an exact replica on any section of the tooth, but that replica effect will be present throughout the tooth length and in exact dimensional conformity with the distance from such apex to any selected point in the direction of length of the tooth, due to the fact that the cutting plane itself radiates from such apex.

Figure 6:
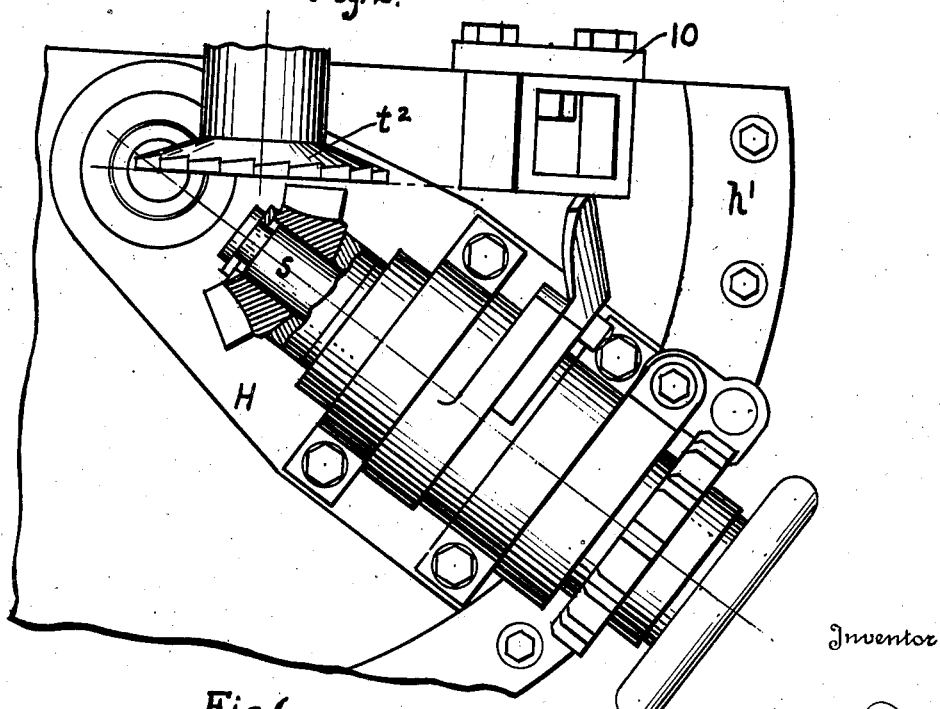
Figs. 6, 7 and 8, are plan views showing three positions of the workhead in cutting a tooth profile, Fig. 6 being a position when the work and cutter are out of engagement, as when indexing.
Figure 3:
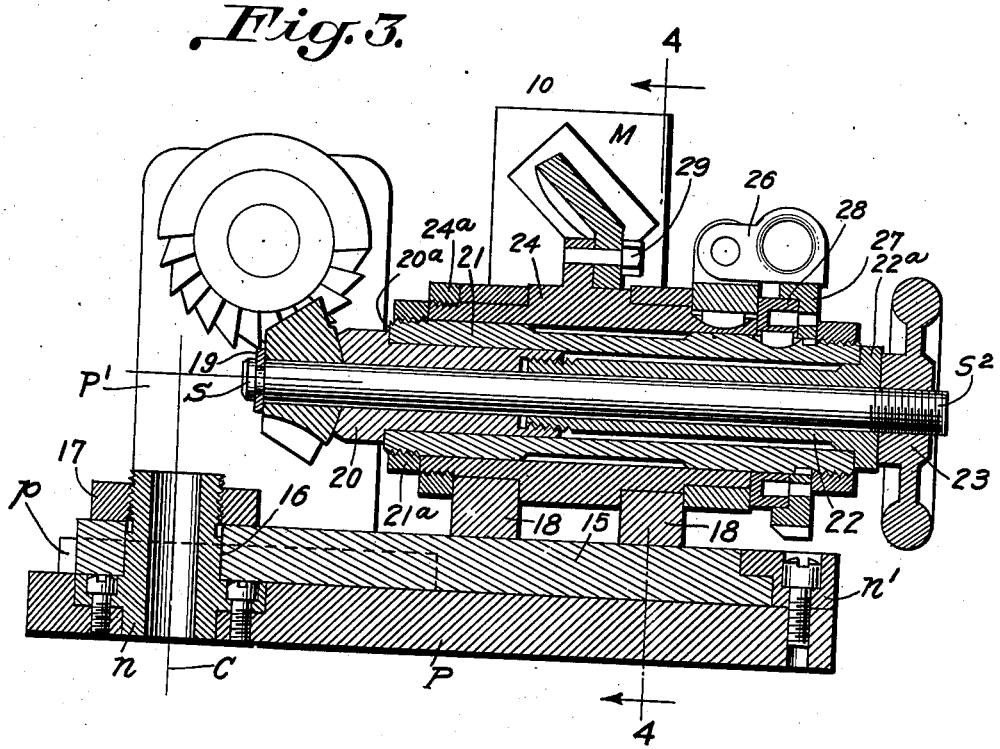
Fig. 3 is a longitudinal sectional view of the work-head unit and its mounting, with certain portions of the cutter unit included, the section being taken on a line corresponding to the position of the work-spindle of the work-head.
Figure 4:
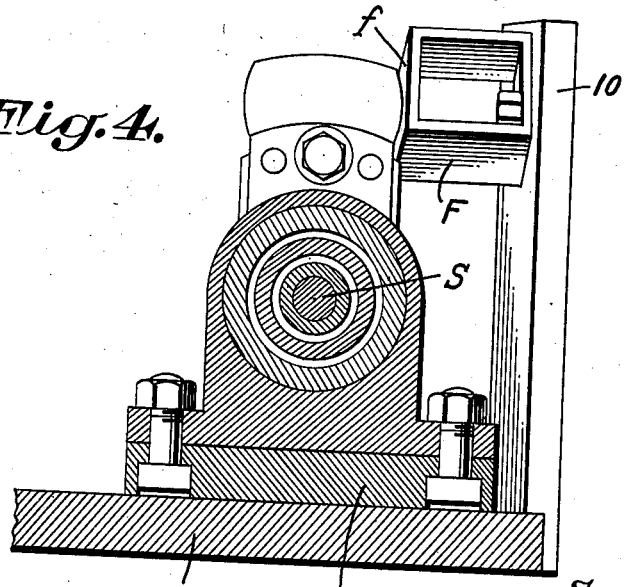
Fig. 4 is a vertical cross-sectional view of the work-head, taken on lines 4—4 of Fig. 3.
Figure 7:
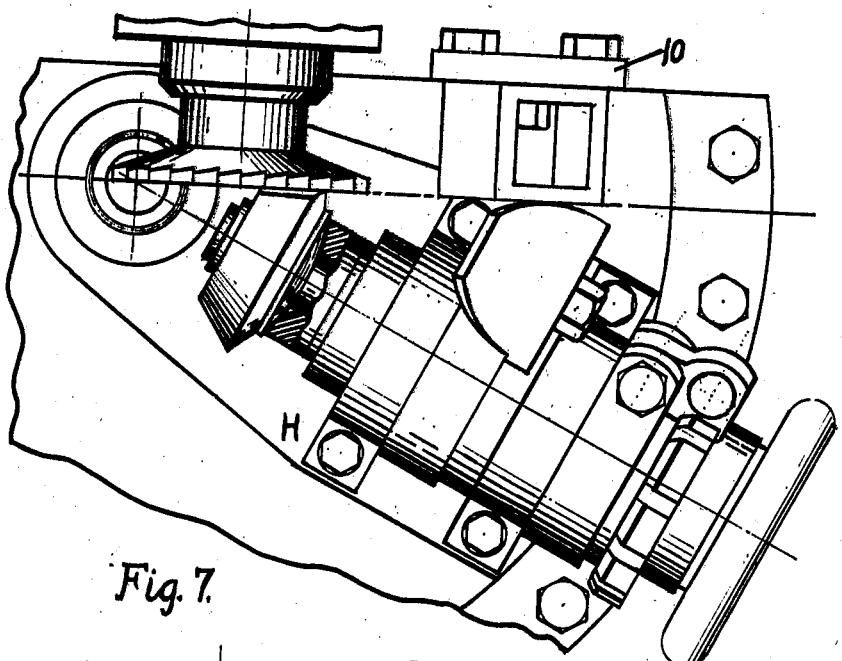
Figure 8:
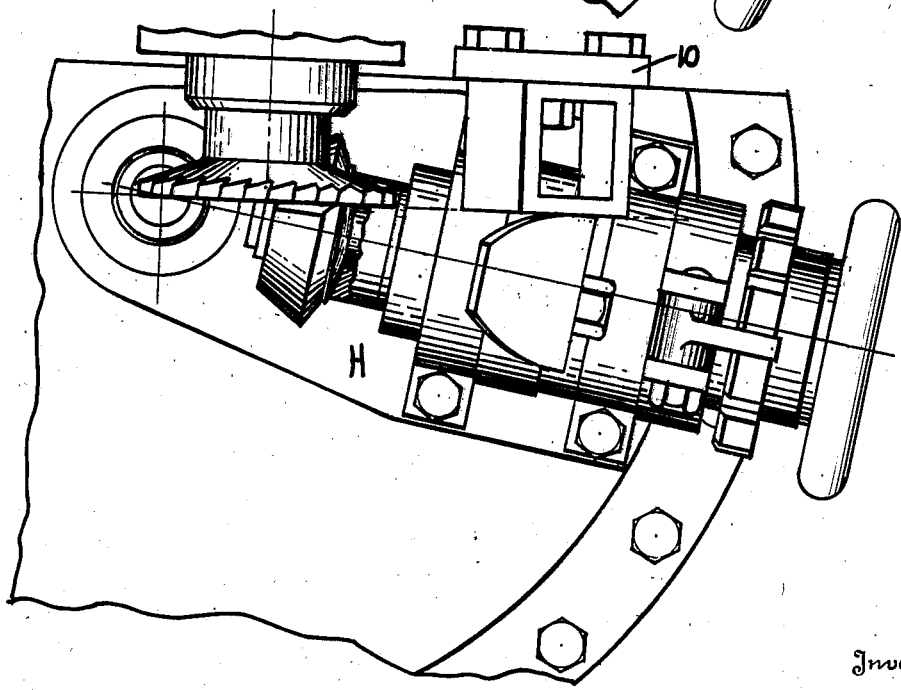

To avoid any possibility of misunderstanding, attention is called to the fact that in the mechanism operation of the disclosed invention, the particular profile of the physical tooth that is being produced by the cutter is the profile of the tooth space which would be the trailing face of such space considered on the basis of the direction of bodily advance of the work. This is due to the fact that while the bodily advance of the work may be toward the cutting and/or guide plane—which might lead to the assumption that the profile of the tooth space closest to such plane would be the profile to be cut—the control through the master actually places the profile of the tooth space remote from such plane as the profile is being cut. This is indicated through a comparison of Figs. 6, 7 and 8. In the first of these the work-unit shows the work as spaced from the cutting plane, the third showing the position when the particular profile has been completed, while the second shows an intermediate position—the bodily advance of work is successively through the three positions shown, but the action of the master is such that the actual cutting is that of the tooth space, and the portion of the cutter in rear of the cutting plane is operative within the tooth space, a condition which leaves the physical tooth profile being produced, as being the tooth face which is the trailing wall of the tooth space when the latter is considered on the basis of the direction of bodily advance of the work.

In the use of the machine embodying the present invention as thus far disclosed in detail, it will be understood that after the work has been positioned on its spindle in the work head, the latter is moved to bring one of the master profiles into contact with its guide face—the full line position of Fig. 1, for instance. The work head is then advanced manually in the same direction thus causing the point of contact of master profile and guide face to traverse the profile face of the master, the close of this advancing movement bringing the cutter to the root zone of the tooth space. The head is then returned to its initial position, the element 26 raised out of the indexing slot with which it had been co-operating, the member 27 then rotated to bring the succeeding or another slot into position and the element 26 restored to active position, thus completing the indexing, after which the work head is again advanced to repeat the production of the profile of the same face of another tooth. This regimen is continued until the indexing has been had with all of the slots, thus completing one of the profiles of each of the teeth of the gear.

The work head is then swung on its pivot through an arc approaching 180°—to the dotted line position of Fig. 1, for instance—thus placing the opposite profile of the master into position to co-operate with the second guide face. Due to the shift in position of the work head the various motions become reversed as compared to the previous work-head position; the bodily-advance movement, while still toward the cutting plane, is reversed as to the angular direction-in Fig. 1, for instance, the work head, in full-line position, would advance counter-clockwise, while in the dotted line position, the advance would be clockwise. As a result, the activities will take place on the profile which forms the wall of the tooth space opposite that previously produced; at the close of the advance, therefore, the tooth space will have been completed. And when the regimen has been continued through each of the index positions, the close of the operation will complete the gear.

In practice, it has been found that the completed gear is substantially a finished gear, due to the fact that owing to the use of the rotating cutter with its succession of flutes or teeth, each of which removes but a thin chip, the succession of tooth activities will leave a smooth surface effect and without any malformations, since the rapid succession of teeth ensure that even though there is a varying position of the point of contact of the master profile with its guide face, the speed of the cutter will render several teeth active within a material shift value, with the result that the product will be sufficiently finished as to be capable of use. Obviously, however, if it be desired to provide an actual and final finish action, the master profiles will be formed to retain sufficient metal on the tooth face for removal during the subsequent finishing action.

Thus far, the detail description has considered the two units—the cutting unit and the work-head unit—as co-operating, in service, on the basis of the cutting unit being relatively stationary with the work-head unit movable, thus permitting relative movement between the units. It is apparent, however, that these conditions can be reversed—the work-head unit be considered as the stationary unit and the cutting unit as the movable unit. This result can be obtained due to the fact that each of the units is complete in itself, and though there is co-operation through the co-action of master and guide face, the unitary characteristic remains. Since the co-action in the control operation can be set up by either moving the master toward a stationary guide face, or moving a guide face toward a stationary master, and with similar results, it can be understood that the cutting unit can become the movable unit and the work head the stationary unit, thus reversing the relationships heretofore described. Such reversal would make the support P a movable instead of a stationary element, and because of this a few changes are required, as indicated in Figs. 9 and 10, which disclose an arrangement by which it is possible to not only make such reversal as a permanent arrangement, but would enable either form to be utilized in the same machine.

In the changed arrangement, the work-head unit is substantially the same as before, with its base located relative to the pivot as before. The changes made are due primarily to the fact that since the support P has now become a movable element, an additional supporting element X is provided below the support P, with the pivot $h$ carried by the element X rather than support P, the latter being movable relative to the pivot rotatively. Since the supporting element X remains stationary, as does the base of the work head, while support P is movable about the axis, provision is made for permitting the work head to be located at any desired point, while permitting freedom of swing of support P.

Figure 10:
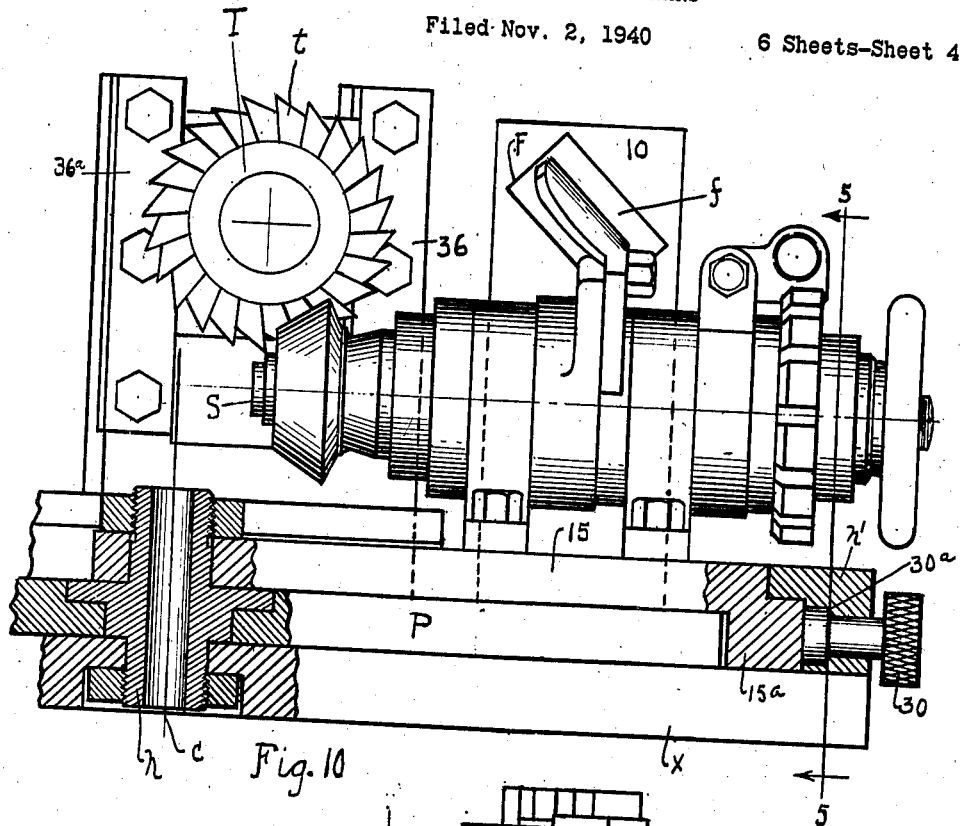
Fig. 10 is a side elevational view, partly in section of the form shown in Fig. 9.
Figure 5:
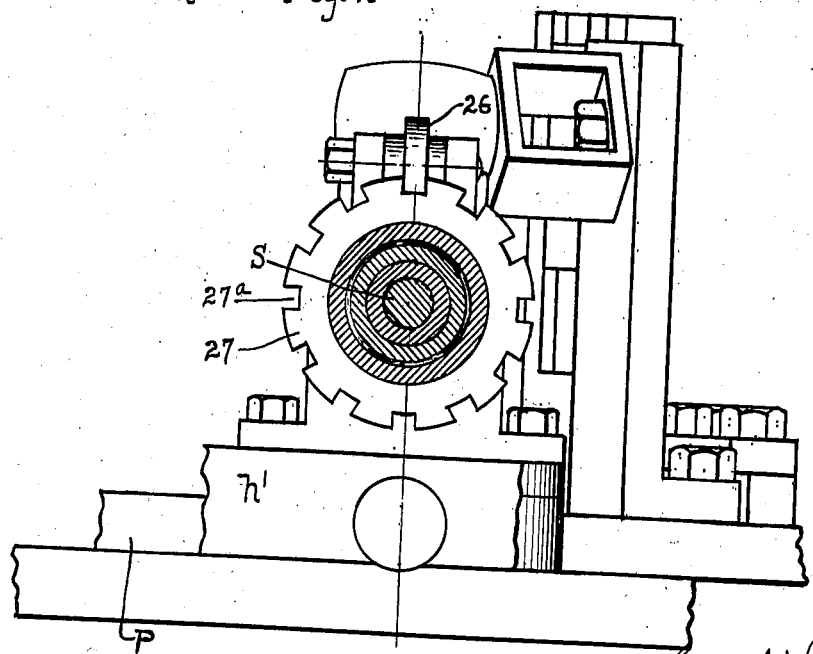
Fig. 5 is a cross-sectional view taken on line 5—5 of Fig. 10.
Figure 9:
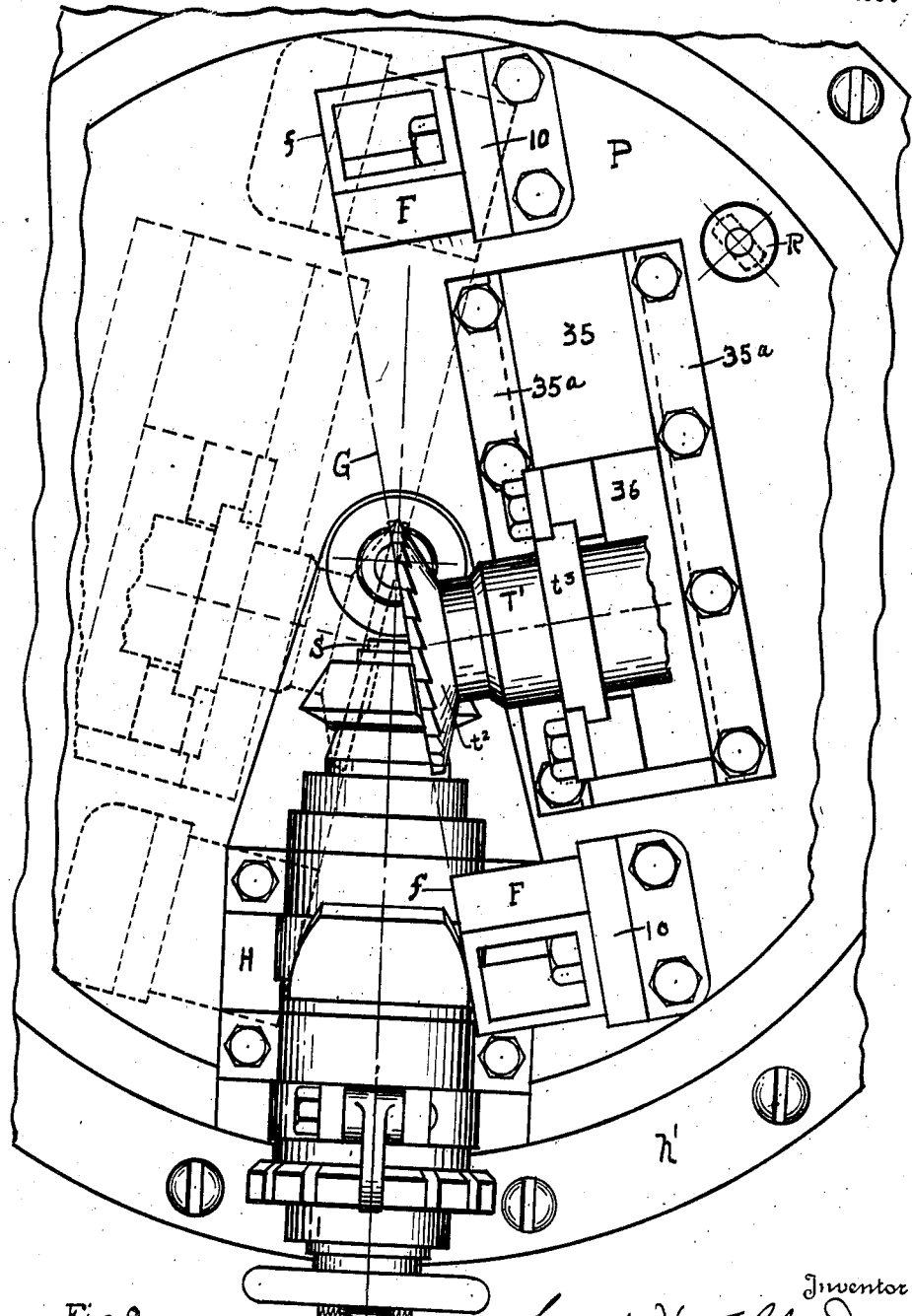
Fig. 9 is a top plan view of the machine when arranged to provide the cutting unit as the movable unit of the assembly.

A simple arrangement for doing this is disclosed in Figs. 9, 10 and 5, in which the support of the arcuate guide flange $h'$ is provided by the supporting element X instead of support P; the base 15 of the head has a peripheral offset 15a of the same depth as support P and located peripherally of such support P, as well as underlying the guide flange $h'$; the guide flange $h'$ carries a locking element 30 which includes a follower 30a contacting the offset 15a. Hence, the base 15 can be placed in any desired position about the pivot $h'$, locked to the supporting element X and leaving the support P free to be swung pivotally about such pivot, the locking of the work-head serving to place it as the stationary unit of the assembly.

Figure 2:
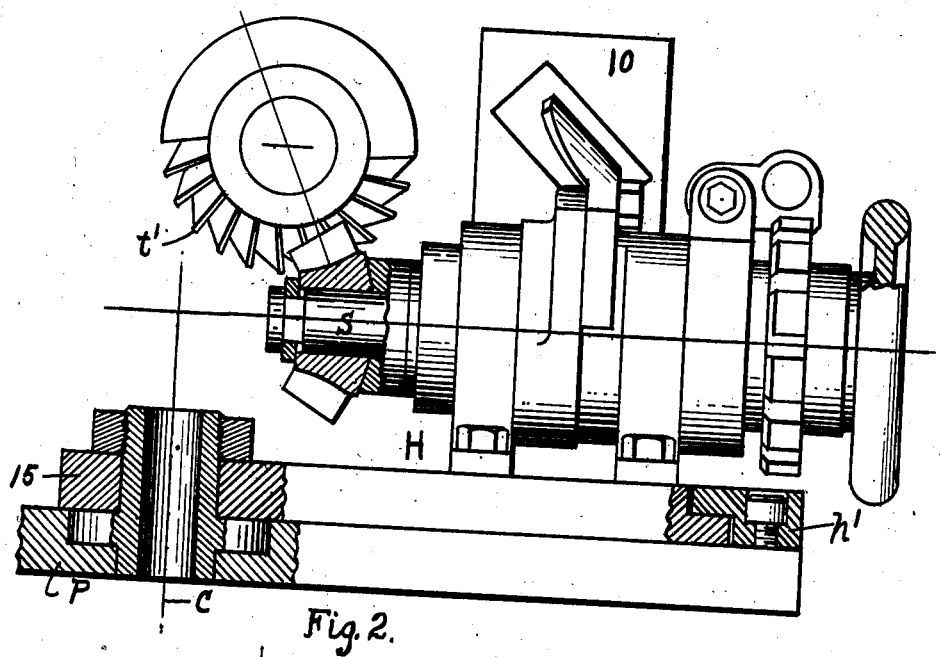
Fig. 2 is a view, partly in elevation and partly in section, of the work head unit and its mounting, together with certain portions of the cutter unit.

In comparing Figs. 2 and 10—which illustrate the changed conditions set up by the reversal of the movable unit,—it will be noted that Fig. 2 does not show the cutter head, while Fig. 10 illustrates part of such cutter head. While this distinction could indicate a change, such is not essential, since the arrangement of Fig. 10 can also be utilized with the structure of Fig. 2. The distinction in this respect is due to the fact that, during the testing periods of the head referred to above, the apparatus of Fig. 2 was mounted on and secured to the table of a milling machine with the cutter-head of the latter serving as the cutter-head of the cutter T. This was made possible through the fact that the support P is stationary in this form, and could therefore be readily secured to the milling machine table. This will indicate that a form of cutter head specific to the machine is not essential when the machine is operating on the basis of the Fig. 2 disclosure.

In the Fig. 10 form, however, the cutting unit is the swingable unit as indicated in Fig. 9—and hence the cutter head must be capable of swinging with the unit. As a result, the preferred arrangement is to place the cutter head as carried by support P, and to drive the cutter by a suitable motor and drive mechanism not shown. Because of the fact that adjustment of the cutter axis may be required, as previously explained, the cutter head assembly, as disclosed, is shown as in the form of a pair of guides 35a carried by a plate 35 secured to support P, the guides receiving a slide 36 which carries upstanding guides 36a, with the cutter head T' having a member $t3$ which co-operate with guides 36a in positioning the cutter head. By this arrangement, the head can be adjusted horizontally as well as vertically—the equivalent of universal adjustment—and thus provide for the various conditions heretofore pointed out. For instance, the full line position of Fig. 9 indicates the slide 36 as at one extreme of its movement with the cutter to one side of the center line of the machine; when the cutting unit is swung to the dotted line position of Fig. 9, the slide is shifted horizontally to place the cutter axis in the same relation to the center line of the machine as before but on the opposite side of the work head; any suitable means may be employed for providing the shift of the slide and to the proper point.

Obviously, this same arrangement may be employed with the Fig. 2 arrangement—in which the work-head is swung instead of the cutter-head—although not specifically required, as indicated above, in the Fig. 2 form; in the Fig. 10 form—in which the cutting unit is the movable unit—it is necessary that all parts of the cutting unit move with the unit, and for this reason the specific form of cutter head, or its equivalent, is preferred.

Actually, the form shown in Figs. 9 and 10 can, by simple manipulation, be used with either unit as the movable unit. For instance, if locking member 30 be released, and support P be locked to the supporting element X in suitable manner—a pin R extending through alined openings of the support and element, for instance—support P will become locked, and base 15 released, thus permitting the apparatus to be operated on the basis of the Fig. 1 disclosure; when the locking member 30 is restored to locking position and the anchoring relation between support P and element X removed, the operation indicated in Fig. 9 is possible. In either case, the cutter unit would then include the cutter head shown in Fig. 9, together with the motor and its driving mechanism. In either form of use, the same result is obtained, the difference being in the particular unit that is being used as the movable unit. There will be a presentation of work to cutter—by movement of the work to the cutting plane or by moving the cutting plane to the work; and, similarly, there will be a presentation of the master to a guide face by the movement of one or the other; hence, the same result is produced regardless of which unit is the movable unit. The two forms are thus substantial equivalents.

The operation of the two forms is clear from the above explanations, as is the theory of action, which places the cutter as actually operating within the tooth space, with the cutting and/or guide plane always extending in direct and proper relation to the geometric conical formation. With the master representing the tooth side of the profile, it is apparent that the point of contact of master profile contour and the guide face will actually represent a similar point of the tooth profile of the work, and that such point will become a line effect through the cutter action with the line exactly related to the geometric conical formation.

The advantages are apparent and have been referred to previously. Not only will the profile contour of the master be accurately produced on the work in producing the physical tooth, but the cutting action will be with great rapidity, due to the fact that it is being done with a rapid succession of flutes or teeth, each of which removes a thin slice or chip of metal with the rapidity such that the surface produced is free of imperfections. Even with the hand manipulation of the machine of the present disclosure, the time required to complete a physical tooth profile, or a tooth, or the complete gear teeth formation, will be materially less than the time required under the art practice, whether the latter be manual or automatic in type. Not only will greater accuracy be present, together with absence of imperfections, but, since the master itself provides the actual control, through control of the movement of the work on its axis during cutting, it is apparent that if the master correctly presents the perfected profile of the spur gear type as translated into the bevel gear status, the machine disclosed will produce the gear of the master, thus breaking down any need for the presence of a lag in the perfection of the bevel gear type of gear, and restoring the machine production as subordinate to the engineering conception as to tooth form as is the case with the production of spur gears; the machine will accurately produce the profile contour of the master with every part of the physical tooth profile face exact with respect to the geometric conical formation—the problem thus pertains to the tooth form and its translation to the master profile contour, an engineering problem involving the engineer's conception of the desired toothform. It is thus possible to produce straighttooth bevel gears which will present exact equivalence in that form to the complete service characteristics of the spur gear form, provided the master profile contours carry such exact equivalency—thus placing the problem characteristics directly to the field of the engineer with the physical gear production a minor factor of the problems involved. Accuracy and perfection of the tooth form and its production with speed and therefore of lower cost of production, are results accruing from the present invention.

While I have herein disclosed an assembled apparatus or machine for the production of bevel gears of the straight tooth type, and have pointed out several ways in which the structure may be provided and operated, it is apparent that changes and modifications thereof may be found desirable or essential in meeting the exigencies of practice and use of the personal desires of individual users, and I therefore desire to be understood as reserving the right to make any and all such changes or modifications, as may be found desirable or essential, insofar as the same fall within the spirit and scope of the invention as expressed in the accompanying claims, when broadly construed.

What I claim is:

1. In a machine for cutting a tooth profile of straight tooth bevel gears on gear blanks, a cutting unit including a rotating cutter and its head, a support co-operative with a pivot the axis of which forms the axial center line of the machine, such support pivot, said support also carrying guide means, said cutter and guide means having faces located in a vertical plane which includes said center line of the machine; and a work-head unit carrying a work-spindle the line of axis of which extends through such center-line of the machine and with the work positioned thereon to place the apex of the geometric conical formation of the work as co-incident with said center line of the machine, said work-head unit also carrying a pivoted master bearing a profile contour presenting the profile contour of a side of the desired gear tooth of the work, such profile contour of the master having a definite relationship to said geometric conical formation, said master and work spindle being operatively related for drive-connection to operate unitedly by concurrent movement of master and work-spindle about the axis of the work-spindle during tooth profile cutting and for drive-disconnection to permit change in relationship during indexing; said units being arranged relatively to each other and to the support pivot to permit bodily swinging of one unit relatively to the other about said support pivot with the swinging movement solely in an arcuate path normal to the pivot axis to thereby concurrently present the work to the cutter and a master profile contour to a guide face, and to thereafter complete the work tooth profile face by maintaining contact of the master profile contour and guide face by continuing such swinging movement until the contact of master and guide face has traversed the active length of the active master profile contour.

2. A machine as in claim 1 in which the work-head unit is the swinging unit.

3. A machine as in claim 1 in which the cutting unit is the swinging unit.

4. A machine as in claim 1 in which either unit may function as the swinging unit at will.

5. In a machine for cutting a tooth profile of straight tooth bevel gears on gear blanks, a cutting unit including a rotating cutter and its head, a support co-operative with a pivot the axis of which forms the axial center line of the machine, such support pivot, said support also carrying guide means, said cutter and guide means having faces located in a vertical plane which includes said center line of the machine; and a work-head unit carrying a work-spindle the line of axis of which extends through such center-line of the machine and with the work positioned thereon to place the apex of the geometric conical formation of the work as co-incident with said center line of the machine, said work-head unit also carrying a pivoted master bearing a profile contour presenting the profile contour of a side of the desired gear tooth of the work, such profile contour of the master having a definite relationship to said geometric conical formation, said master and work spindle being operatively related for drive-connection to operate unitedly by concurrent movement of master and work-spindle about the axis of the work-spindle during tooth profile cutting and for drive-disconnection to permit change in relationship during indexing; said units being arranged relatively to each other and to the support pivot to permit bodily swinging of one unit relatively to the other about said support pivot with the swinging move-pivot axis to thereby concurrently present the work to the cutter and a master profile contour to a guide face, and to thereafter complete the work tooth profile face by maintaining contact of the master profile contour and guide face by continuing such swinging movement until the contact of master and guide face has traversed the active length of the active master profile contour; and to thereafter complete a tooth space by shifting the movable unit by a swinging action to bring a second profile contour of the master individual to the opposite side of tooth profile face into contact with a second guide face of the guide means to thereby bring work and cutter and profile contour and guide face into contact, and then remove the remaining metal of the tooth space by maintaining contact of the second master profile face and second guide face by continuing the swinging movement of the movable unit in such direction of shift until the contact of master and guide face has traversed the active length of such second master profile contour.

6. In a machine for cutting a tooth profile of straight tooth bevel gears on gear blanks, a cutting unit including a rotating cutter and its head, a support co-operative with a pivot the axis of which forms the axial center line of the machine, such support pivot, said support also carrying guide means, said cutter and guide means having faces located in a vertical plane which includes said center line of the machine; and a work-head unit carrying a work-spindle the line of axis of which extends through such centerline of the machine and with the work positioned thereon to place the apex of the geometric conical formation of the work as co-incident with said center line of the machine, said work-head unit also carrying a pivoted master bearing a profile contour presenting the profile contour of a side of the desired gear tooth of the work, such profile contour of the master having a definite relationship to said geometric conical formation, said master and work-spindle being operatively related for drive connection to operate unitedly by concurrent movement of master and work-spindle about the axis of the work-spindle during tooth profile cutting and for drive disconnection to permit change in relationship during indexing; said units being arranged relatively to each other and to the support pivot to permit bodily swinging of one unit relatively to the other about said support pivot with the swinging movement solely in an arcuate path normal to the pivot axis to thereby concurrently present the work to the cutter and a master profile contour to a guide face, and to thereafter complete the work tooth profile face by maintaining contact of the master profile contour and guide face by continuing such swinging movement until the contact of master and guide face has traversed the active length of the active master profile contour; and to thereafter complete a tooth space by swinging the movable unit about such center line of the machine to bring a second profile contour of the master individual to the opposite side of tooth profile face and a second guide face of the guide means into active contact, and then maintain the contact of master profile contour and guide face by continuing such latter swinging movement until the contact of master and guide face has traversed the active length of the second master profile contour to thereby remove the remaining metal of the tooth space.

7. In a machine for cutting a tooth profile of straight tooth bevel gears on gear blanks, a cutting unit including a rotating cutter and its head, a support co-operative with a pivot the axis of which forms the axial center line of the machine, such support pivot, said support also carrying guide means, said cutter and guide means having faces located in a vertical plane which includes said center line of the machine; and a work-head unit carrying a work-spindle the line of axis of which extends through such centerline of the machine and with the work positioned thereon to place the apex of the geometric conical formation of the work as co-incident with said center line of the machine, said work-head unit also carrying a pivoted master bearing a profile contour presenting the profile contour of a side of the desired gear tooth of the work, such profile contour of the master having a definite relationship to said geometric conical formation, said master and work spindle being operatively related for drive connection to operate unitedly by concurrent movement of master and work-spindle about the axis of the work-spindle during tooth profile cutting and for drive disconnection to permit change in relationship during indexing; said units being co-related in operation to provide the following sequence of operations by a relative swinging movement of one unit to the other about said support pivot with the swinging movement solely in an arcuate path extending in a horizontal plane normal to the axis of the support pin: concurrently present the work to the cutter and such master profile contour to a guide face with both presentations provided on said vertical plane, render the cutter active in the tooth space area by continuing the swinging movement of the movable unit in such horizontal plane and concurrently controlling the development of a side wall profile of the tooth space by a controlled rotation of the work on its own axis during such swinging movement with the rotation control provided by maintaining contact of the master profile contour and the guide face on said vertical plane until the point of contact of contour and face has traversed the active length of the master profile contour.

8. In a machine for cutting a tooth profile of straight tooth bevel gears on gear blanks, a cutting unit including a rotating cutter and its head, a support co-operative with a pivot the axis of which forms the axial center line of the machine, such support pivot, said support also carrying guide means, said cutter and guide means having faces located in a vertical plane which includes said center line of the machine; and a work-head unit carrying a work-spindle the line of axis of which extends through such center-line of the machine and with the work positioned thereon to place the apex of the geometric conical formation of the work as co-incident with said center line of the machine, said work-head unit also carrying a pivoted master bearing a profile contour presenting the profile contour of a side of the desired gear tooth of the work, such profile contour of the master having a definite relationship to said geometric conical formation, said master and work spindle being operatively related for drive-connection to operate unitedly by concurrent movement of master and work-spindle about the axis of the work-spindle during tooth profile cutting and for drive-disconnection to permit change in relationship during indexing; said units being co-related in operation to provide the following sequence of operations by swinging movement of the work head unit about said support pivot with the swinging movement solely in an arcuate path extending in a horizontal plane normal to the axis of the support pin: concurrently present the work to the cutter and such master profile contour to a guide face with both presentations provided on said vertical plane to thereby bodily advance the work in the direction of and to such plane, continue such bodily advance of the work by the advance of the work-head unit to render the cutter active within a tooth space of the work, and concurrently providing controlled work rotation on its own axis by the maintained contact of master profile contour and guide face on said vertical plane until such contact has traversed the active length of the active master profile contour to thereby develop the profile of a side wall of the tooth space in which the cutter is active.

9. In a machine for cutting a tooth profile of straight tooth bevel gears on gear blanks, a cutting unit including a rotating cutter and its head, a support co-operative with a pivot the axis of which forms the axial center line of the machine, such support pivot, said support also carrying guide means, said cutter and guide means having faces located in a vertical plane which includes said center line of the machine; and a work-head unit carrying a work-spindle the line of axis of which extends through such center-line of the machine and with the work positioned thereon to place the apex of the geometric conical formation of the work as co-incident with said center line of the machine, said work-head unit also carrying a pivoted master bearing a profile contour presenting the profile contour of a side of the desired gear tooth of the work, such profile contour of the master having a definite relationship to said geometric conical formation, said master and work spindle being operatively related for drive connection to operate unitedly by concurrent movement of master and work-spindle about the axis of the work-spindle during tooth profile cutting and for drive disconnection to permit change in relationship during indexing; said units being co-related in operation to provide the following sequence of operations by the swinging movement of the cutter unit about said support pivot with the swinging movement solely in an arcuate path extending in a horizontal plane normal to the axis of the support pivot: concurrently present the work to the cutter and such master profile to a guide face with both presentations provided on said vertical plane to thereby bodily swing said vertical plane and the cutter and guide face about such axial center and into contact engagement with work and master profile contour respectively, continue such swinging movement of such plane to cause the cutter to become active within a tooth space of the work and to cause controlled rotative movement of the work on its own axis during the cutter activity to thereby control the development of the profile of a side wall of such tooth space during such swinging movement of the cutting unit and said plane with the profile development dependent upon the contact of guide face and master profile contour and during the period in which such contact traverses the active length of the active master profile contour.

10. In a machine for cutting a tooth profile of straight tooth bevel gears on gear blanks, a cutting unit including a rotating cutter and its head, a support co-operative with a pivot the axis of which forms the axial center line of the machine, such support pivot, said support also carrying guide means, said cutter and guide means having faces located in a vertical plane which includes said center line of the machine; and a work-head unit carrying a work-spindle the line of axis of which extends through such center-line of the machine and with the work positioned thereon to place the apex of the geometric conical formation of the work as co-incident with said center line of the machine, said work-head unit also carrying a pivoted master bearing a profile contour presenting the profile contour of a side of the desired gear tooth of the work, such profile contour of the master having a definite relationship to said geometric conical formation, said master and work spindle being operatively related for drive-connection to operate unitedly by concurrent movement of master and work-spindle about the axis of the work-spindle during tooth profile cutting and for drive-disconnection to permit change in relationship during indexing; said units being co-related in operation to provide the following sequence of operations by the swinging movement of the work head unit about said support pivot with the swinging movement solely in an arcuate path extending in a horizontal plane normal to the axis of the support pin: concurrently present the work to the cutter and such master profile contour to a guide face with both presentations provided on said vertical plane to thereby bodily advance the work in the direction of and to such plane, continue such bodily advance of the work by the advance of the work-head unit to render the cutter active within a tooth space of the work, and concurrently providing controlled work rotation on its own axis by the maintained contact of master profile contour and guide face on said vertical plane until such contact has traversed the active length of the active master profile contour to thereby develop the profile of a side wall of the tooth space in which the cutter is active, and thereafter completing the tooth zone by shifting the work-head unit horizontally and in an arcuate path to establish contact on said vertical plane between a second guide face and a second profile contour of the master individual to the opposite side of tooth profile face and through continuation of the advancing movement of the work-head unit in such direction of shift to thereby remove the remaining metal and develop the second side wall profile of the tooth spaced by the cutter activity in the space as determined by the pattern of the second profile contour of the master.

11. In a machine for cutting a tooth profile of straight tooth bevel gears on gear blanks, a cutting unit including a rotating cutter and its head, a support co-operative with a pivot the axis of which forms the axial center line of the machine, such support pivot, said support also carrying guide means, said cutter and guide means having faces located in a vertical plane which includes said center line of the machine; and a work-head unit carrying a work-spindle the line of axis of which extends through such center-line of the machine and with the work positioned thereon to place the apex of the geometric conical formation of the work as co-incident with said center line of the machine, said work-head unit also carrying a pivoted master bearing a profile contour presenting the profile contour of a side of the desired gear tooth of the work, such profile contour of the master having a definite relationship to said geometric conical formation, said master and work spindle being operatively related for drive connection to operate unitedly by concurrent movement of master and work-spindle about the axis of the work-spindle during tooth profile cutting and for drive disconnection to permit change in relationship during indexing; said units being co-related in operation to provide the following sequence of operations by the swinging movement of the cutter unit about said support pivot with the swinging movement solely in an arcuate path extending in a horizontal plane normal to the axis of the support pivot: concurrently present the work to the cutter and such master profile to a guide face with both presentations provided on said vertical plane to thereby bodily swing said vertical plane and the cutter and guide face about such axial center and into contact engagement with work and master profile contour respectively, continue such swinging movement of cutter and plane to cause the cutter to become active within a tooth space of the work and to cause controlled rotative movement of the work on its own axis during the cutter activity to thereby control the development of the profile of a side wall of such tooth space during such swinging movement of the cutting unit and said plane with the profile development dependent upon the contact of guide face and master profile contour and during the period in which such contact traverses the active length of the active master profile contour and thereafter completing the tooth zone by swinging the cutting unit with said vertical plane horizontally about such axial center of the machine to establish contact on such plane between a second guide face and a second profile contour of the master individual to the opposite side of tooth profile face and, through continuation of such swinging movement of the cutter unit remove the remaining metal and develop the second side wall profile of the tooth space by the cutter activity in the space as detemined by the pattern of the second profile contour of the master.

12. In machines for cutting a tooth profile of straight-tooth bevel gears on gear blanks, and in combination, a rotating cutter and its head, a support co-operative with a pivot the axis of which forms the axial center line of the machine, such support pivot, said support carrying guide means, said cutter and guide means having faces located in a vertical plane which includes said center line of the machine, and a work-head unit swingable about such pivot solely in an arcuate path extending in a horizontal plane normal to the axis of the support pin and carrying a work-spindle the line of axis of which extends through such center line of the machine and with the work positioned thereon to place the apex of the geometric conical formation of the work as co-incident with said center line of the machine, said unit also carrying a pivoted master bearing a profile contour presenting the profile contour of a side of the desired gear tooth of the work, such profile contour of the master having a definite relationship to said geometric conical formation, said master and work spindle being operatively related for drive-connection to operate unitedly by concurrent movement of master and work-spindle about the axis of the work-spindle during tooth profile cutting and for drive disconnection to permit change in relationship during indexing, swinging movement of the unit about such pivot relative to said vertical plane being operative to concurrently present the work to the cutter face and the master profile contour to a guide face on such plane and to thereafter complete the work tooth profile face by continuing such swinging movement until the contact of master and guide face has traversed the active length of the master profile contour.

13. In machines for cutting a tooth profile of straight-tooth bevel gears on gear blanks, and in combination, a rotating cutter and its head, a support co-operative with a pivot the axis of which forms the axial center line of the machine, such support pivot, said support carrying guide means, said cutter and guide means having faces located in a vertical plane which includes said center line of the machine, and a work-head unit swingable about such pivot solely in an arcuate path extending in a horizontal plane normal to the axis of the support pin and carrying a work-spindle the line of axis of which extends through such center line of the machine and with the work positioned thereon to place the apex of the geometric conical formation of the work as co-incident with said center line of the machine, said unit also carrying a pivoted master bearing a profile contour presenting the profile contour of a side of the desired gear tooth of the work, such profile contour of the master having a definite relationship to said geometric conical formation, said master and work spindle being operatively related for drive-connection to operate unitedly by concurrent movement of master and work-spindle about the axis of the work-spindle during tooth profile cutting and for drive disconnection to permit change in relationship during indexing, swinging movement of the unit about such pivot relative to said vertical plane being operative to concurrently present the work to the cutter face and the master profile contour to a guide face on such plane and to thereafter complete the work tooth profile face by continuing such swinging movement until the contact of master and guide face has traversed the active length of the master profile contour, said machine being operative to thereafter complete the tooth space by swinging the unit about such pivot in the opposite direction to thereby concurrently present the work to the cutting face and a second profile contour of the master individual to the opposite side of tooth profile face to a second guide face on said vertical plane and complete the tooth space by repeating the operation of the first regimen with the second master profile contour in control and with the unit advance continuing in such second direction to thereby develop the second profile wall of the tooth space and complete removal of tooth space metal.

14. A machine as in claim 12 characterized in that the operating connections between the work spindle and the master include the indexing mechanism of the machine, whereby the connection is normally complete and disconnection is present solely when indexing.

15. A machine as in claim 12 characterized in that the cutter head is mounted to permit adjustment of the cutter axis in both horizontal and vertical directions to thereby permit location of such cutter axis in definite and predetermined relationship to the root angle of the gear tooth space.

16. A machine as in claim 1, characterized in that the work-head unit includes a base superposed with respect to the cutting unit support, with the base co-operating with the pivot in controlling swinging movements of the work head unit, a supplemental support underlying the cutting unit support and carrying such pivot with the support and base swingable about the pivot, and separate means operative to lock the base to the supplemental support and for locking the support to the supplemental support, the assembly being such that activity of the base locking means and inactivity of the support locking means causes the machine to operate with the cutting unit as the movable unit while activity of the support locking means and inactivity of the base locking means causes the machine to operate with the work-head unit as the movable unit.

17. A machine as in claim 1, characterized in that the cutting unit includes adjusting means for the cutter head with the means positioned between the cutter head and the support and being operative to permit bodily shifting of the cutter head vertically and/or horizontally at will to thereby permit location of such cutter axis in definite and predetermined relationship to the root angle of the gear tooth space.

18. A machine as in claim 12 characterized in that the work head master comprises a hub zone axially alined with the work-spindle axis and arranged to permit such connection and disconnection with the work spindle, and a profile contour carrying section removably secured to the hub section to thereby permit substitution of master control formations at will without affecting hub zone conditions.

19. A machine as in claim 12 characterized in that the work head master comprises a hub zone axially alined with the work-spindle axis and arranged to permit such connection and disconnection with the work spindle, and a profile contour carrying section removably secured to the hub section to thereby permit substitution of master control formations at will without affecting hub zone conditions, said section including an attaching zone extending normal to the hub zone axis and an outer zone inclined thereto with such inclined portion carrying the profile contour.

20. In apparatus for cutting bevel gears, a cutter head, a cutter in said head, planar guide means in the same plane as said cutter, a spindle, means for holding a gear blank concentric with said spindle, a master, said master being rotatable about the axis of said spindle, and means for causing said master and said spindle to rotate together about the axis of said spindle including indexing means for controlling relative rotative movement of said spindle with respect to said master, said master being engageable with said planar guide means to control rotative movement of said gear blank to cut bevel gear teeth in said gear blank having in shape a fixed geometric relationship to the shape of said master.

21. In an apparatus for cutting bevel gears, a cutter head, a cutter in said head and having a cutting face, a plurality of planar guide means in the same plane as said cutter face, a pivot having its axis in the plane of said cutter face and guide means, a spindle, means for swinging said spindle about said pivot, means for holding a gear blank concentric with said spindle, a master, said master being rotatable about the axis of said spindle, and means for causing said master and said spindle to rotate together about the axis of said spindle including indexing means for controlling relative rotative movement of said spindle with respect to said master, said master being engageable with one of said planar guide means to control rotative movement of said gear blank to cut bevel gear teeth faces in said gear blank having in shape a fixed geometric relationship to the shape of said master, said master and said spindle being swingable about said pivot to engage said master with another of said planar guide means.

22. In an apparatus for cutting bevel gears, a cutter head, a cutter in said head and having a cutting face, a plurality of planar guide means in the same plane as said cutter face, a pivot having its axis in the plane of said cutter face and guide means, a spindle having an axis perpendicular and intersecting the axis of said pivot, means for holding a gear blank concentric with said spindle, a master, said master being rotatable about the axis of said spindle, means for causing said master and said spindle to rotate together about the axis of said spindle including indexing means, said master being engageable with one of said planar guide means to control rotative movement of said gear blank to cut bevel gear teeth faces in said gear blank having in shape a fixed geometric relationship to the shape of said master, said master and said spindle being swingable about said pivot to engage said master with another of said planar guide means.

FRANK V. ELBERTZ.